United States Patent [19]

Ng

[11] Patent Number: 5,003,494
[45] Date of Patent: Mar. 26, 1991

[54] DATA STORAGE SYSTEM FOR AN ELECTRONIC COLOR PRINTER

[75] Inventor: Yee S. Ng, Fairport, N.Y.

[73] Assignee: Eastman Kodak Company, Rochester, N.Y.

[21] Appl. No.: 451,839

[22] Filed: Dec. 18, 1989

[51] Int. Cl.[5] .............................................. G06K 15/00
[52] U.S. Cl. .................................... 364/519; 346/157; 358/80
[58] Field of Search ................. 364/518–521, 364/930 MS, 235 MS; 346/154, 157; 358/31, 80, 296, 298

[56] References Cited

U.S. PATENT DOCUMENTS

| | | | |
|---|---|---|---|
| 4,270,141 | 5/1981 | Sakamoto | 358/78 |
| 4,694,406 | 9/1987 | Shibui et al. | 364/518 |
| 4,724,431 | 2/1988 | Holtey et al. | 340/703 |
| 4,953,104 | 8/1990 | Yeh et al. | 364/519 |

Primary Examiner—Arthur G. Evans
Attorney, Agent, or Firm—Milton S. Sales

[57] ABSTRACT

Method and apparatus for economically storing page data for reproduction by a high quality, color, gray-scale printer. A relatively large color value memory is used to store 24-bit color values for the entire page as they are received from the incoming data. The addresses of the color values are also stored in a pixel cell memory along with data which represents the sharpness or exact position of every pixel used to represent text/graphics images. A fixed number of memory bytes are used in the pixel cell memory to store both the sharpness data and the color value addresses for the multi-pixel area corresponding to the fixed number of bytes. In the event the large color memory becomes full of color values before the entire page has been stored, color values in a default memory are selected and addressed by the data stored in the cell memory. The default memory is much smaller than the main color memory. Additional processing can be used to reduce the number of color values needed to be stored in the color memory.

20 Claims, 3 Drawing Sheets

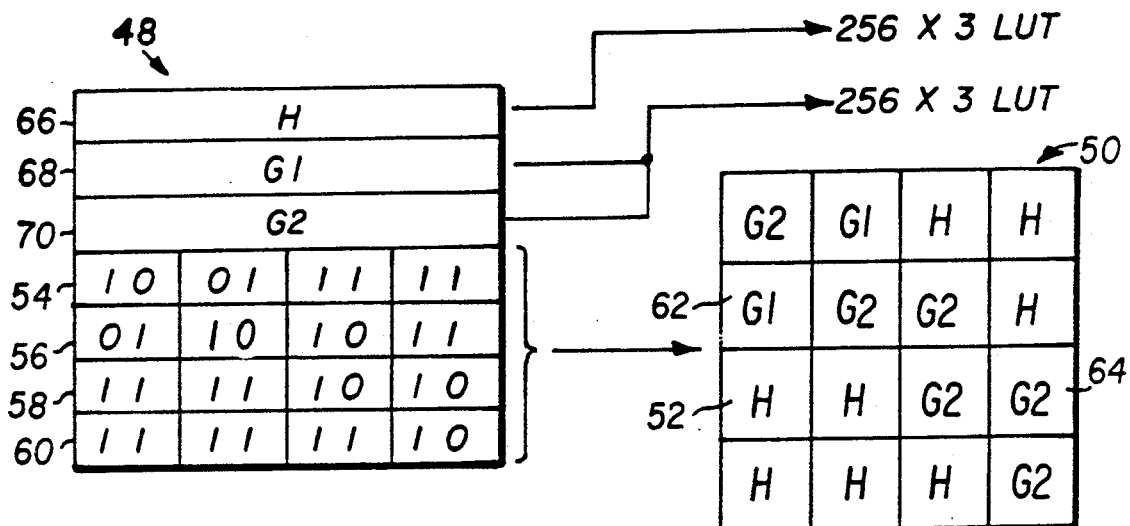
FIG. 4
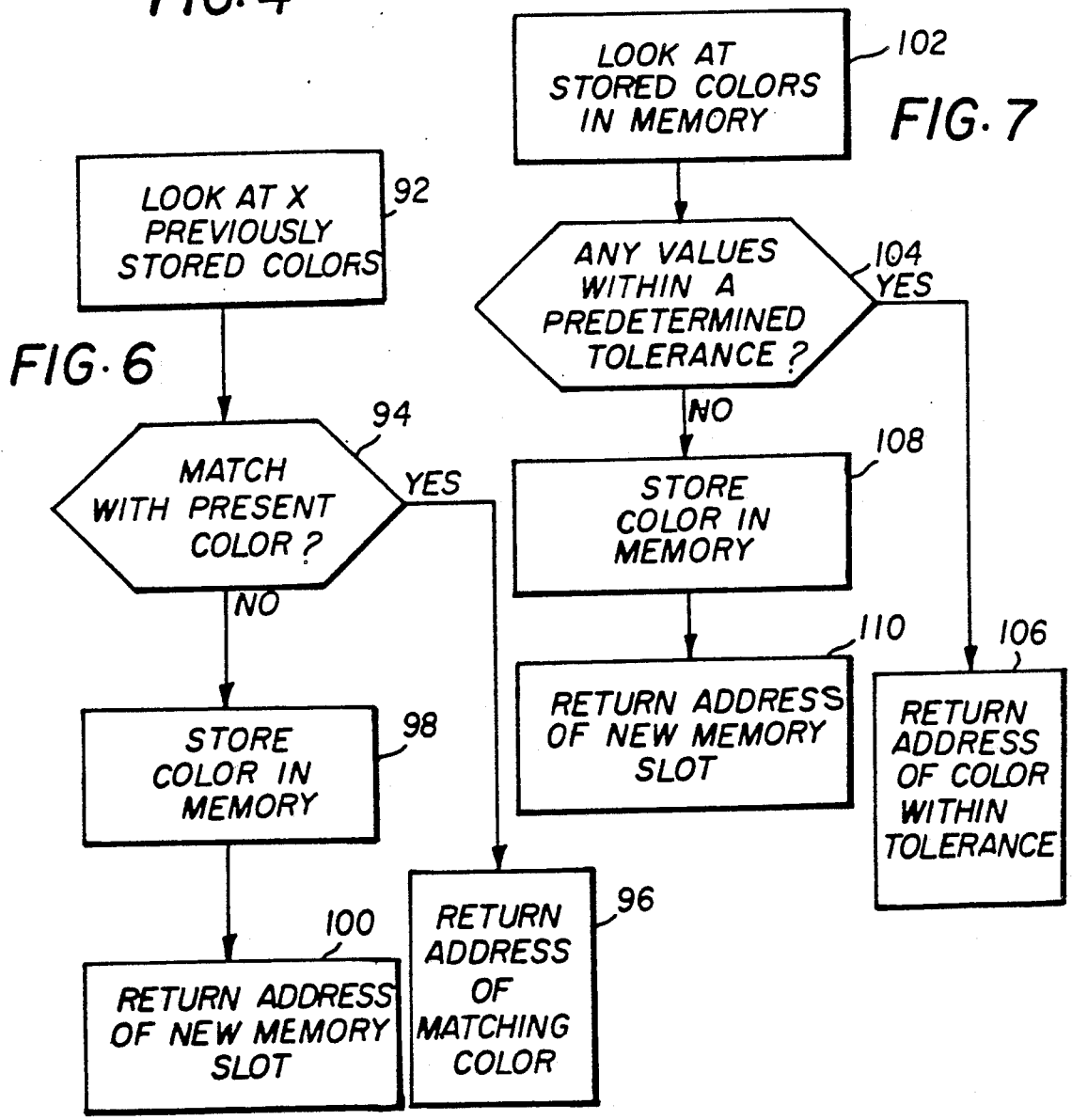
FIG. 6
FIG. 7

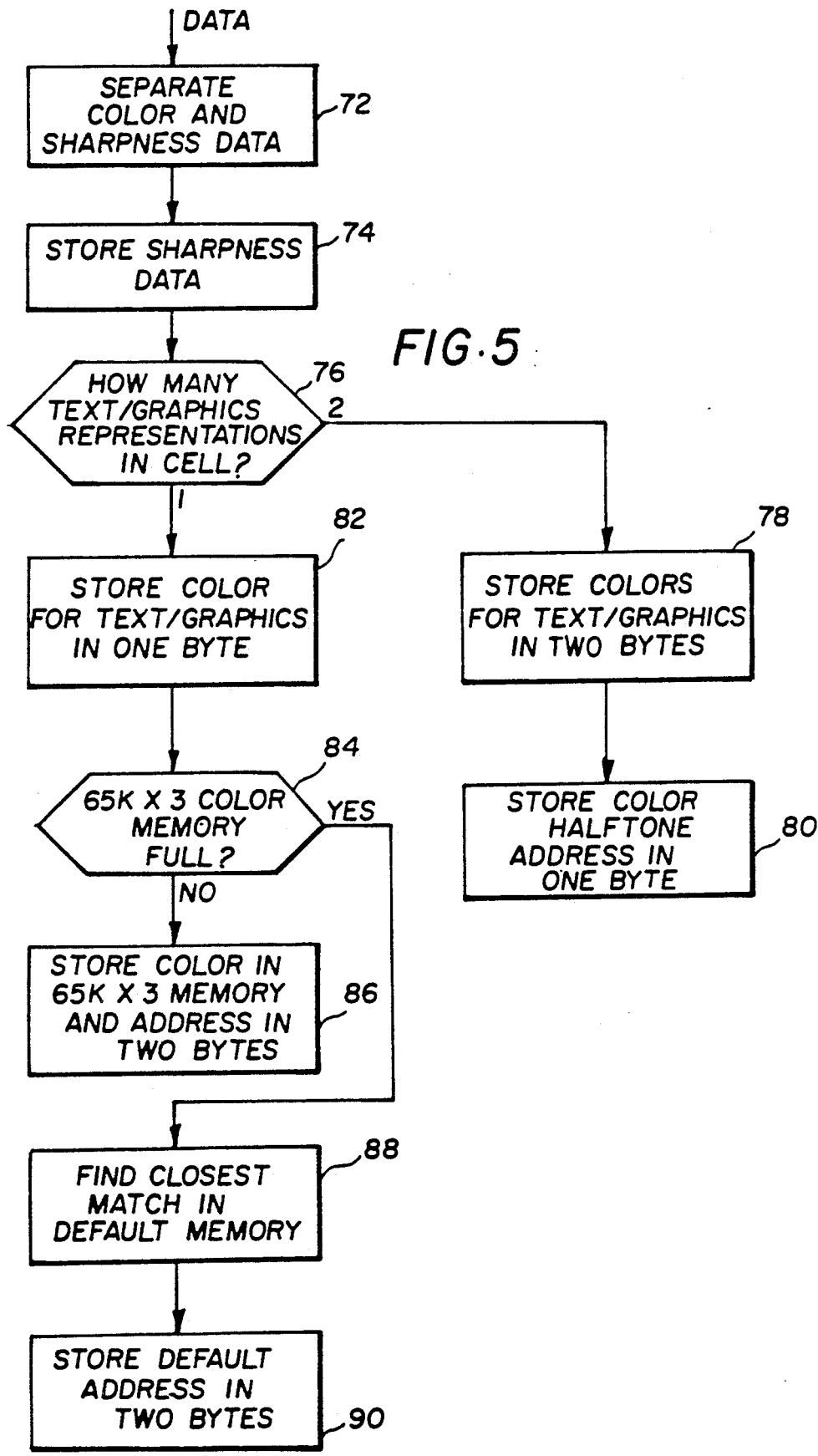

DATA STORAGE SYSTEM FOR AN ELECTRONIC COLOR PRINTER

BACKGROUND OF THE INVENTION

1. Field of the Invention

This invention relates, in general, to electronic color printers and, more specifically, to apparatus and methods for storing page data in memory buffers of electronic color printing devices.

2. Description of the Prior Art

The amount of memory needed to store information or data which is to be printed by a gray-scale, color printer can be extremely large when high quality printing is desired. The format in which the printers require the data is also involved in establishing the memory requirements for the printer. Ordinarily, the data for such printers is defined for a complete page before the data is processed and applied to the printhead or other device which creates the page image on a hard copy medium, such as a sheet of paper. Because of the wide range of colors which may be specified by the data, conventional memory arrangements and traditional bit-maps would have to be extremely large to accommodate data for high quality images.

Some data storage techniques use a limited number of colors to specify the color values used in defining the page. In such systems, a fixed number of colors are stored in a lookup table and the address of the color is stored in a page memory. When printing takes place, the processor goes to the indicated address in the lookup table and retrieves a multibit color value. The number of different colors which can be used with such systems is usually in the range of 256 to 512 total colors. While this type of storage may be sufficient in certain applications, some specialized applications may require color specification to a more precise degree in order to faithfully reproduce the image.

The maximum number of different colors which can be specified is dependent upon the number of bits used to define the color values. Twenty-four bits are used by some widely used color standards to specify colors. Such a bit level means that over 16,000,000 different color values can be specified. A lookup table containing all of these values would present an uneconomical requirement for memory space for most printers.

Although the number of different colors which can be defined is very large, one page may not have near that many colors existing on the page. Even a high quality page can be printed with fewer color choices, such as approximately 65,000 different colors. Such a number of color values is still large but can be accommodated by using special memory utilization techniques. A large number of colors required for quality representation is especially important with mixed mode page data wherein high resolution text/graphics lines exist on a background of shaded colors.

Therefore, it is desirable, and it is an object of this invention, to provide a data storage system for color printers which can preserve the resolution and quality of color content in the defined page without requiring an uneconomical amount of memory space.

SUMMARY OF THE INVENTION

There are disclosed herein new and useful apparatus and methods for storing page data which is to be used for producing high quality color images by a gray-scale printer. A relatively large first or color value memory is used to store 24-bit color values which define the background or halftone color pixels contained within a multi-pixel cell. The addresses of the color values stored in the color value memory are stored in a plurality of bytes in a pixel cell memory. In the event that the color value memory becomes filled before all of the color values for the page can be stored, a default memory containing a much smaller number of color values is used to determine the color value which will be printed. The address of this default value is then stored in the pixel cell memory. The cell memory also contains a plurality of pixels which define the sharpness information for the pixel cell, or the exact location of the halftone and graphics/text pixels within the pixel cell.

The invention disclosed herein can also use two different techniques for reducing the number of color values stored in the color value memory. One technique looks at a predetermined number of previously stored color values to see if the present value to be stored is a match with a previously stored value. If there is such a match, the previously stored value is used for the present color value and no new value is stored in the memory. In another reduction technique, the entire color value memory is scanned to determine if there is a close match within a predetermined tolerance between the value to be stored and any previously stored value. If there is such a close match, that value is used for the color value and no new value is stored in the color value memory.

The memory optimizing features of this invention take advantage of the perceived quality in a color print by an observer at normal distance from the hard copy medium. In other words, sharpness and color information is only stored to the degree which can be determined and noticed by a normal observer. Extraneous color and sharpness information which cannot be noticed by an observer is not stored according to the page storing technique of this invention.

BRIEF DESCRIPTION OF THE DRAWINGS

Further advantages and uses of this invention will become more apparent when considered in view of the following detailed description and drawings, in which:

FIG. 4 is a diagram illustrating a specific memory format and the corresponding pixel cell layout according to another embodiment of the invention;

FIG. 5 is a flow chart illustrating the general method used in storing the data;

FIG. 6 is a flow chart illustrating a method for reducing the number of color values required to be stored; and FIG. 7 is a flow chart illustrating another method for reducing the number of color values required to be stored.

DESCRIPTION OF THE PREFERRED EMBODIMENTS

Figure 1:
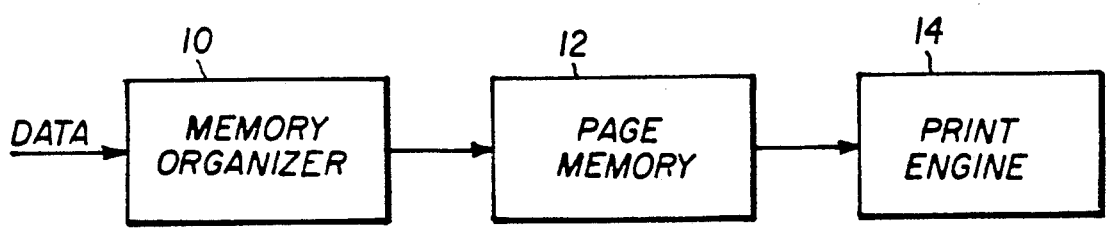
FIG. 1 is a block diagram of the data path in an electronic color printer.

Throughout the following description, similar reference characters refer to similar elements or members in all of the figures of the drawings.

Referring now to the drawings, and to FIG. 1 in particular, there is shown a generalized block diagram of the data path used in an electronic color printer. The memory organizer 10 receives the page data from an appropriate source, such as a computer terminal or engineering work station. Normally, data at this point would be in the form of page description language. The memory organizer 10 arranges this data into the proper format for storage into the page memory 12. Once stored in the page memory 12, the data is transferred to the print engine 14 at the appropriate time to be printed on the output hard copy medium by the print engine 14. Since the page memory 12 must be able to contain or store all of the data which is to be printed on the entire page, and also since some printers may have enough memory for several pages, it is important that the required amount of memory space be kept to a minimum consistent with the ability of the printer to produce high quality images. In the case of a four-color printer, the size of the memory 12 can be relatively large and memory conservation is even more important.

Figure 2:
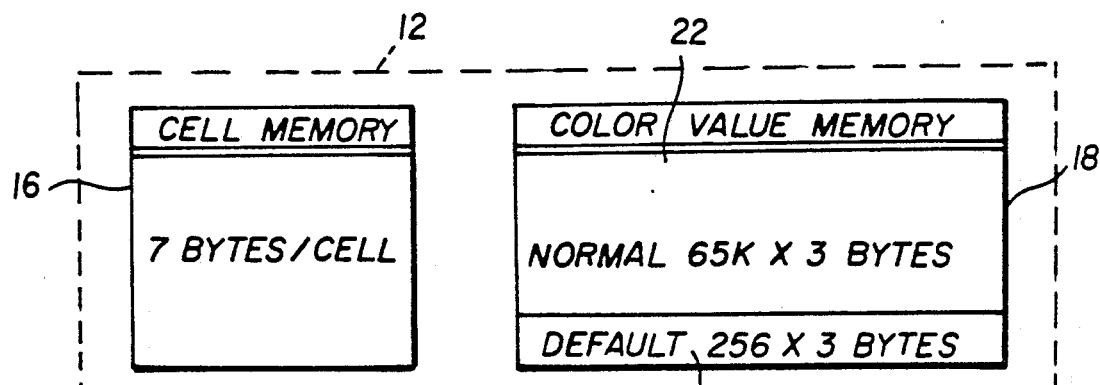
FIG. 2 is a more detailed representation of the page memory shown in FIG. 1.

FIG. 2 is a more detailed representation of the page memory 12 shown in FIG. 1. According to FIG. 2, the page memory 12 consists of the pixel cell memory 16 and the color value memory 18. The cell memory 16 contains a fixed number of bytes or memory locations for a group of adjacent pixels, which are referred to as a pixel cell. In this specific embodiment of the invention, seven bytes are allocated to a 16-pixel cell. Although other numbers may be used, a byte in this description refers to a memory word containing eight bits of binary information. The complete cell memory would contain many seven-byte memory slots to define the complete page which is to be printed. For example, an 8.5×11" page at 400 dots per inch (dpi) would have 9,350,000 pixel cells of 16 pixels each. This would require the same number of seven-byte memory slots to define the content of the printed page.

In order to properly define the pixel cell in the seven bytes allocated thereto, a technique of separating the color information from the sharpness or exact pixel location information in this invention used to represent text/graphics lines. The exact format may vary somewhat from the embodiment described herein and, in addition, the number of bytes per pixel cell can be changed within the contemplation of the invention. However, it is the separation of the color and sharpness information which allows a conservation of memory to be realized in the pixel cell memory 16. This technique is based upon the fact that when printing precise and high resolution text/graphics pixels within the cell, the exact location of the pixels is needed to be included in the information stored in the cell memory 16. On the other hand, color halftone areas represented within the pixel cell can be represented by a single color value for the entire cell without degrading the perceived color resolution of the printed page, provided a sufficient number of colors can be stored and printed by the apparatus.

While the cell memory 16 contains information about the sharpness and color information to be printed, color value memory 18 contains the actual values of the colors which will be reproduced by the printing apparatus. The locations of the values in memory 18 are addressed by the "color" bytes stored in the seven-byte memory slot of FIG. 16. In other words, a particular seven-byte memory slot in memory cell 16 defines the sharpness and color information for a particular 16-pixel cell in the printed page by having some of its bytes addressing or pointing to a color value in the lookup table or color value memory 18.

As is shown in FIG. 2, the memory 18 contains or is allocated approximately 65,000 slots or locations capable of storing three bytes or 24 bits of color value information. This information can be in any of the normally used color standards, such as L*a*b. As the information is acquired by the memory organizer 10 (FIG. 1), the color values are stored in the normal portion of the color value memory 18, and the address of such storage is stored in the pixel cell memory 16. If and when the color value memory 18 becomes full of color values during the storage of the page data, the default portion 20 of the color value memory 18 comes into play. The default memory 20 contains, in this specific embodiment, 256 three-byte color values which can be selected as the closest match to the desired color value and addressed by the data put into the memory 16. In other words, when normal memory section 22 becomes full, the system can use the approximated value in default memory section 20 to finish the page storage without the major problems associated with not having space to store the actual color values in the memory 18.

The color values stored in the default memory section 20 are preloaded or prestored into the memory 18 either at the time of construction of the printer, or downloaded from the data source prior to storing the page data. In any event, the normal memory section 22, having 65,000 memory slots, would be sufficient to contain full color information for most printed pages. In the cases where an even greater number of color values is needed to adequately define the page in high quality, the default memory section 20 may be used to provide a close approximation to the desired value. This eliminates the need for having dedicated memory which is much greater than the size typically needed in most normal page data storage applications.

Figure 3:
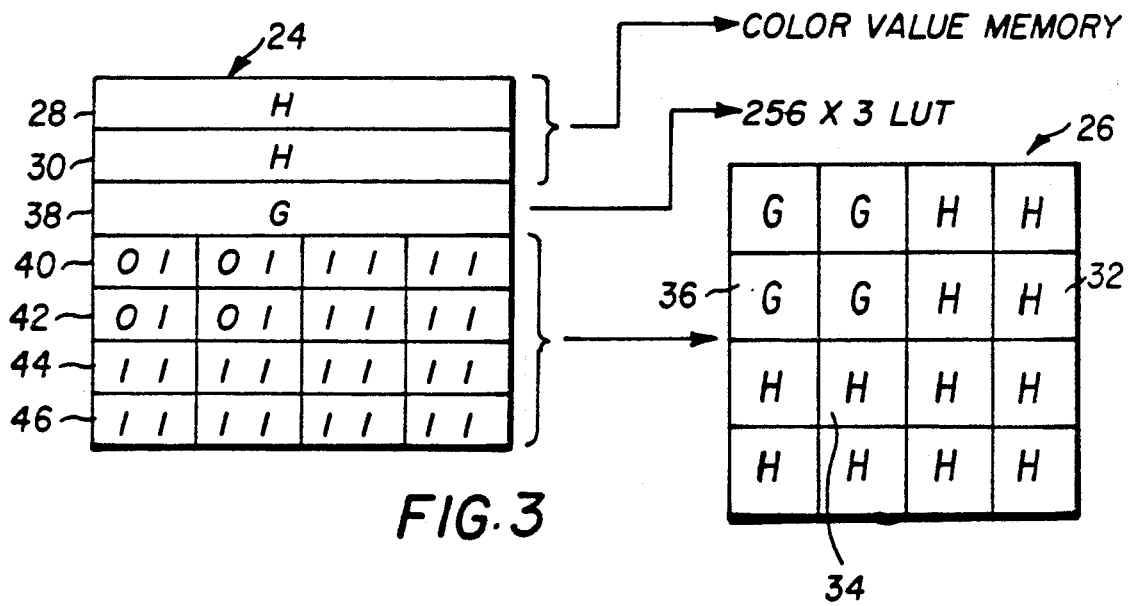
FIG. 3 is a diagram illustrating a specific memory format and the corresponding pixel cell layout according to one embodiment of the invention.

FIG. 3 is a diagram illustrating a specific memory format and the corresponding pixel cell layout according to one specific embodiment of the invention. According to FIG. 3, the memory slot 24, which contains seven bytes, corresponds to the pixel cell 26, which contains 16 pixels in a four-by-four pattern. "Color" bytes 28 and 30 provide the 16 bits necessary to address the 65K color value memory for defining the color halftone areas in the pixel cell 26. These areas are represented by the "H" located within the pixel block, such as pixels 32 and 34. Since text/graphic high resolution lines may need to be represented by pixels within the pixel cell 26, and since these can also be in color, additional color information is needed in the memory slot 24. By way of illustrating these possibilities, the pixel cell 26 is shown to have four graphic pixels which are labeled "G" in pixel cell 26, such as pixel 36. Byte 38 is used to specify the color to be printed in the graphics pixels of pixel cell 26. Thus, byte 38 addresses or points to a 256×3 lookup table (LUT) which contains the color values applicable to text and graphics colors which will be printed. This LUT can be prestored with the color values and can be the default memory 20 shown in FIG. 2, or a separate lookup table.

Using one byte for the graphic representation and two bytes for the halftone color value addressing is a convenient tradeoff between the colors needed to be specified and the amount of memory space available. Graphic colors usually do not have the wide range of shading or color changes normally associated with halftone or background colors. Thus, the perceived quality of the printed page can be obtained by using a smaller range of available color values for the graphics representations than used for the halftone color representations of the pixels within the cell 26.

The remaining four bytes 40, 42, 44 and 46 of memory slot 24, which is just one of many slots in the pixel cell memory 16 (FIG. 2), define the sharpness information to be used in reproducing the pixel cell 26. Each pixel within the cell 26 is represented by a two-bit value in the bytes 40-46. Halftone pixels, such as pixel 32, are represented by the binary number 1 1. Graphics pixels, such as pixel 36, are represented by the binary number 0 1. By combining the sharpness information in bytes 40-46 with the color information in bytes 28, 30 and 38, the pixel cell memory 16 containing the seven-byte memory slots can adequately define a high quality color image page in a reasonable amount of memory space.

FIG. 4 is a diagram illustrating a specific memory format and the corresponding pixel cell layout according to another embodiment of the invention. This embodiment or variation in the memory technique is applicable when two different graphics or text colors are required to be specified within the same pixel cell area. According to FIG. 4, the memory slot 48 corresponds to the pixel cell 50. The color halftone pixels, such as pixel 52, are represented by the binary numbers 1 1 in bytes 54, 56, 58 and 60 in the seven-byte memory slot 48. "G1" graphics pixels, such as pixel 62, are printed in one color in the pixel cell 50 and are represented by the binary number 0 1 in the sharpness bytes of the memory slot 48. The other graphics color is represented by the "G2" pixels, such as pixel 64, and is identified by the binary number 1 0 shown in the sharpness bytes of memory slot 48. Thus, sharpness bytes 54-60 define whether the 16 pixels in pixel cell 50 are to be printed in the colors represented by bytes 66, 68 or 70.

A pixel cell having two text/graphics lines represents a special case in the representation of the pixel cell 50 wherein three colors must be specified to adequately define the colors needed for printing the pixels. Thus, each of the color bytes 66, 68 and 70 can select from 256 24-bit color values. While this arrangement limits the number of possible colors of the halftone pixels to 256 instead of 65,000, as in the previous embodiment, it is noted that pixel cells with more than one graphic pixel tend to be less demanding in defining the halftone colors than pixel cells containing only one graphic/text line on a colored halftone background. In other words, the more text/graphic components included in the pixel 50, the less important it becomes to be concerned with the color of the background information on which the graphic components are printed. The 256×3 LUT's addressed by the bytes 66, 68 and 70 may be different for each byte, may use a common table for two bytes (as shown), may use the default memory, or may use other preloaded or prestored values within the contemplation of the invention.

FIG. 5 is a flow chart illustrating the general method used in storing the data according to this invention. The steps performed in the diagram of FIG. 5 are performed primarily by the memory organizer 10 shown in FIG. 1. Step 72 separates the incoming data into the color and sharpness data or information components. The sharpness data is stored into the memory slot in the sharpness bytes, as indicated by step 74. A decision, as indicated in step 76, is made concerning how many text/graphics representations are included in the pixel cell which corresponds to the data being processed. If there are two graphics representations within the cell, as shown in FIG. 4 herein, the process flow goes to step 78 where two bytes are used to store the addressing information for the color values to be used in printing the pixels for the two graphic components. According to step 80, the remaining byte is used to store the address for the halftone color to be printed in the cell.

If the number of text/graphics representations within the pixel cell is only one, the process flow proceeds to step 82 to store information according to the embodiment shown in FIG. 3. In step 82, the one graphics byte of the color bytes is used to address the color for the graphics pixels. The two remaining color bytes are then used to store the address for the color value to be used in printing the halftone color areas or pixels in the pixel cell. According to step 84, a determination is made as to whether the normal 65K memory is already completely used or full of previously stored color values for that particular page. If it is not full, then the two-byte address is stored in the two color bytes of the pixel cell memory, as indicated in step 86. At the same time, the actual color value is stored in the color value memory, as also indicated by step 86. In the case where the 65K memory is full, the process flow is diverted to step 88 where the closest match of the specified color is found in the default memory. The address of the match in the default memory is then stored in the two bytes of the cell memory, as indicated in step 90.

Special techniques may be used along with this invention to limit or reduce the number of color values which need to be stored in the color value memory. FIG. 6 is a flow chart illustrating one method or technique for reducing the number of color values required to be stored. As indicated in step 92, the memory organizer first looks at an "X" number of previously stored colors in the color value memory to determine if a match is present, as indicated in step 94. For example, the previously stored 16 values can be scrutinized to determine if the present color which is being specified by the data has just recently been specified. In such case, it is not necessary to store the color value again and the address of the previously stored color is returned, as indicated in step 96, for storage in two bytes of the color memory. If there is not a match in the previously stored colors, storage and addressing proceeds in the normal manner, as indicated in steps 98 and 100. In other words, the specified color value is stored in the color value memory, and the address thereof is stored in two bytes of the pixel cell memory.

FIG. 7 is a flow chart illustrating another method or technique for reducing the number of color values required to be stored. According to step 102 in FIG. 7, the memory organizer looks at all of the stored colors in the color value memory. As an alternative, only a set containing a limited number of previously stored values may be looked at. Next, as indicated in step 104, it is determined whether the present value is within a predetermined tolerance of any previously stored color value. In other words, it is determined whether the present value to be stored is a close match to any previously stored value. If a close match is found, that value is used to specify the color, and its address is stored in the two bytes of the cell memory, as indicated in step 106. If no close match is found, step 108 stores the new or present color value in the memory, and the address thereof is returned for storage in the cell memory, as indicated in step 110.

The apparatus and methods of storing page data described herein use a specific memory arrangement to take advantage of the perceived quality of a printed color page when certain parameters in the page are defined in memory with more preciseness than other parameters. It is emphasized that numerous changes may be made in the above-described system without departing from the teachings of the invention. It is intended that all of the matter contained in the foregoing description, or shown in the accompanying drawings, shall be interpreted as illustrative rather than limiting.

I claim as my invention:

1. A data storage system for an electronic color printer, said storage system comprising:
   a first memory containing a plurality of memory locations suitable for storing color values indicative of colors to be printed by the printer;
   a default memory containing a plurality of memory locations suitable for prestoring color values, said default memory having substantially less memory locations than said first memory;
   means for separating the data being stored into color values and sharpness data;
   a second memory containing a plurality of memory locations suitable for storing sharpness data and address information defining stored locations of the color values; and
   means for storing the color values for one page of data into the first memory and for storing address information into the second memory which identifies the stored color value locations and, if the first memory cannot accommodata all of the color values for the page, storing address information into the second memory which identifies the locations of prestored color values in the default memory.

2. The data storage system of claim 1 wherein the address information stored in the second memory identifies the location of the closest match in the default memory to the desired color value.

3. The data storage system of claim 1 wherein the color values stored in the first and default memories are in the form of twenty-four bit color space data.

4. The data storage system of claim 1 wherein the default memory has sufficient memory locations to store values for 256 colors.

5. The data storage system of claim 1 wherein the second memory has a plurality of memory slots, with each slot having a fixed number of bytes allocated to a pixel cell containing a predetermined number of pixels.

6. The data storage system of claim 5 wherein there are at least seven bytes allocated for every 16 pixel cell.

7. The data storage system of claim 6 wherein three of the bytes are used to store the color address information and four of the bytes are used to store the sharpness data.

8. The data storage system of claim 7 wherein two of the three color address information bytes are used to identify a single color for halftone color representation within the cell and the other color address information byte is used to identify a single color for graphics/text representation within the cell.

9. The data storage system of claim 7 wherein one of the color address information bytes is used to identify a single color for halftone color representation within the cell and the other two color address information bytes are each used to identify a color for graphics/text representation within the cell.

10. The data storage system of claim 1 including means for reducing the number of color values needed to be stored into the first memory.

11. The data storage system of claim 10 wherein the reducing means compares a predetermined number of previously stored values to find a similar color value and, if a match is found, the address stored in the second memory identifies the location of the similar color value.

12. The data storage system of claim 10 wherein the reducing means compares all the previously stored color values to find a value which matches the current value within a predetermined tolerance and, if a match is found, the address stored in the second memory identifies the location of the matched color value.

13. A data storage system for an electronic color printer, said storage system comprising:
   a first memory containing a plurality of memory locations suitable for storing 24-bit color space values indicative of colors to be printed by the printer;
   a default memory containing a plurality of memory locations suitable for prestoring 24-bit color space values, said default memory having substantially less memory locations than said first memory;
   means for separating the data being stored into color values and sharpness data;
   a second memory containing a plurality of memory locations suitable for storing sharpness data and address information defining stored locations of the color values, said second memory having a fixed number of bytes allocated to a predetermined pixel cell size in the data being stored; and
   means for storing the color values for one page of data into the first memory and for storing address information into the second memory which identifies the stored color value locations and, if the first memory cannot accommodate all the color values for the page, storing address information into the second memory which identifies the location of the closest match to prestored color values in the default memory.

14. The data storage system of claim 13 wherein the first memory is capable of storing over 65K of color values, and the default memory is capable of storing less than 257 color values.

15. The data storage system of claim 13 wherein there are at least seven bytes allocated to each pixel cell, each pixel cell contains 16 pixels, three of the seven bytes are used for storing the color address information for the cell, and four of the seven bytes are used for storing the sharpness data for the cell.

16. A method of storing page data for an electronic color printer, said method including the steps of:
   separating sharpness data and color values from the page data;
   storing the sharpness data in a cell memory having a predetermined number of bytes allocated to each pixel cell in the page;
   storing, when storage space permits, the color values in a color memory and storing the address of the stored color values into the cell memory; and
   storing, when the color memory becomes full for the page of data, the address of a similar color value located in a default memory into the cell memory, said default memory being prestored with color values.

17. The page data storing method of claim 16 including the step of comparing the color value to be stored with a predetermined number of previously stored color values for similarity and, if a similarity is found, storing the address of the previously stored color value into the cell memory.

18. The page data storing method of claim 16 including the step of comparing the color value to be stored with all of the previously stored color values and, if a match is found within a predetermined tolerance, storing the address of the previously stored color value into the cell memory.

19. The page data storing method of claim 16 including the step of comparing the color value to be stored with a limited previously stored set of color values and, if a match is found within a predetermined tolerance, storing the address of the previously stored color value into the cell memory.

20. A method of storing page data for an electronic color printer, said method including the steps of:
separating sharpness data and color values from the page data;
storing the sharpness data in a cell memory;
storing address information into the cell memory to identify the location of color values in either a color value memory or a default memory;
storing color values into the color value memory when sufficient space exists;
prestoring color values into the default memory prior to the storing of values into the color value memory; and
reducing the number of color values stored in the color value memory by comparing the value to be stored with previously stored values.

* * * * *